(12) United States Patent
Buck et al.

(10) Patent No.: US 8,215,196 B2
(45) Date of Patent: Jul. 10, 2012

(54) TONG GEAR SHIFT SYSTEM

(75) Inventors: David A. Buck, Breaux Bridge, LA (US); Mark Gravouia, Lafayette, LA (US)

(73) Assignee: McCoy Corporation, Alberta (CA)

( * ) Notice: Subject to any disclaimer, the term of this patent is extended or adjusted under 35 U.S.C. 154(b) by 428 days.

(21) Appl. No.: 12/109,698

(22) Filed: Apr. 25, 2008

(65) Prior Publication Data

US 2011/0088495 A1  Apr. 21, 2011

Related U.S. Application Data

(60) Provisional application No. 60/914,562, filed on Apr. 27, 2007.

(51) Int. Cl.
*F16H 59/04* (2006.01)
(52) U.S. Cl. ......................................... 74/335
(58) Field of Classification Search ...................... 74/335
See application file for complete search history.

(56) References Cited

U.S. PATENT DOCUMENTS

| | | | |
|---|---|---|---|
| 2,950,639 A | 8/1960 | Mason | |
| 6,446,524 B1 * | 9/2002 | Gravouia | 74/459.5 |
| 7,237,450 B2 * | 7/2007 | Ogasawara et al. | 74/473.12 |
| 2002/0189804 A1 * | 12/2002 | Liess et al. | 166/77.51 |
| 2006/0032339 A1 * | 2/2006 | Dagenais et al. | 81/57.18 |

FOREIGN PATENT DOCUMENTS

GB  2345330  7/2000

OTHER PUBLICATIONS

Page from a Farr, Inc. catalogue published in the United States prior to Apr. 2006.
Pages 72/132 and 73/132 of the attached FARR Canada manual illustrate a device in public use in the United States prior to Apr. 2006.

* cited by examiner

*Primary Examiner* — Edwin A Young
(74) *Attorney, Agent, or Firm* — Jones, Walker, Waechter, Poitevent, Carrere & Denegre L.L.P

(57) ABSTRACT

A power tong having a ring gear, a gear train, a motor and a gear shift mechanism. The gear shift mechanism further includes a linear actuator and a shift arm connect to the linear actuator. A drive gear is positioned on a drive shaft extending from the motor and this drive gear includes an upper and lower set of drive teeth having beveled top portions. The shift arm engages the drive gear between the upper and lower set of drive teeth and movement of the linear actuator causes the drive gear to engage one of at least two gears in the gear train.

21 Claims, 10 Drawing Sheets

TONG GEAR SHIFT SYSTEM

This application claims the benefit under 35 USC §119(e) of U.S. provisional application No. 60/914,562 filed Apr. 27, 2007, which is incorporated by reference herein in its entirety.

I. FIELD OF INVENTION

The present invention relates to devices for applying torque to tubular members such as drill pipe. In a particular embodiment, the invention relates to transmission systems in power tongs.

II. BACKGROUND OF INVENTION

Many devices such as power tongs employ a transmission or gear train having different gears (or sets of gears) for operating at different speeds and torque ratios. An example of such a power tong is seen in U.S. Pat. No. 4,631,987, which is incorporated by reference herein in its entirety. In order to run the gear train at different speeds, the power source (e.g., a motor shaft) must selectively engage the different gears in the gear train. This typically entails selectively bringing a drive gear on the motor shaft into engagement with the appropriate set of gears in the gear train in order to run the device at the desired speed.

Transmissions in power tongs are normally less complex than in other machinery such as automobiles. Typical manual automobile transmissions have mechanisms such as a clutch to selectively remove load from the gears and synchronizers to assist the gears in meshing at the same speed. With these mechanisms to assist gear meshing, the shape of the top surface of the gears is not of great consequence and is normally flat.

However, because power tongs do not have complex gear meshing mechanisms and because the gears of the transmission may be stationary when the shift occurs, the largely flat top surface on the teeth of such gears often interferes with the gears meshing smoothly. Operators will typically attempt to run the motor at low speeds to facilitate the meshing of the gears. However, this often leads to the "grinding" of the gears and excessive wear on the gear teeth, particularly if the motor is run at too high of a speed during meshing. It would be a significant improvement in the art to provide a gear system which facilitated meshing in general and in certain examples, facilitated meshing without applying power to the drive gear.

III. SUMMARY OF SELECTED EMBODIMENTS OF THE INVENTION

One embodiment of the invention is a power tong having a ring gear, a gear train, a motor and a gear shift mechanism. The gear shift mechanism further includes a linear actuator and a shift arm connect to the linear actuator. A drive gear is positioned on a drive shaft extending from the motor and this drive gear includes an upper and lower set of drive teeth having beveled top portions. The shift arm engages the drive gear between the upper and lower set of drive teeth and movement of the linear actuator causes the drive gear to engage one of at least two gears in the gear train.

Another embodiment of the invention includes a tong body having a top plate and a bottom plate forming a cavity there between. A ring gear and gear train are positioned within the cavity and the gear train includes a high speed and a low speed gear. A motor has a drive shaft extending directly into said cavity and the drive shaft includes a drive gear connected thereon which selectively engages the high speed gear or the low speed gear. A linear actuator is positioned above the top plate with a rod extension projecting into the cavity substantially parallel to the motor drive shaft. A shift arm is operatively connected to the rod extension and capable of moving the drive gear into selective engagement with at least one of the high or low speed gears.

IV. BRIEF DESCRIPTION OF DRAWINGS

FIGS. 1A, 1B, and 1C illustrate a prior art tong gear shift mechanism.

V. DETAILED DESCRIPTION OF SELECTED EMBODIMENTS

Figure 1A:
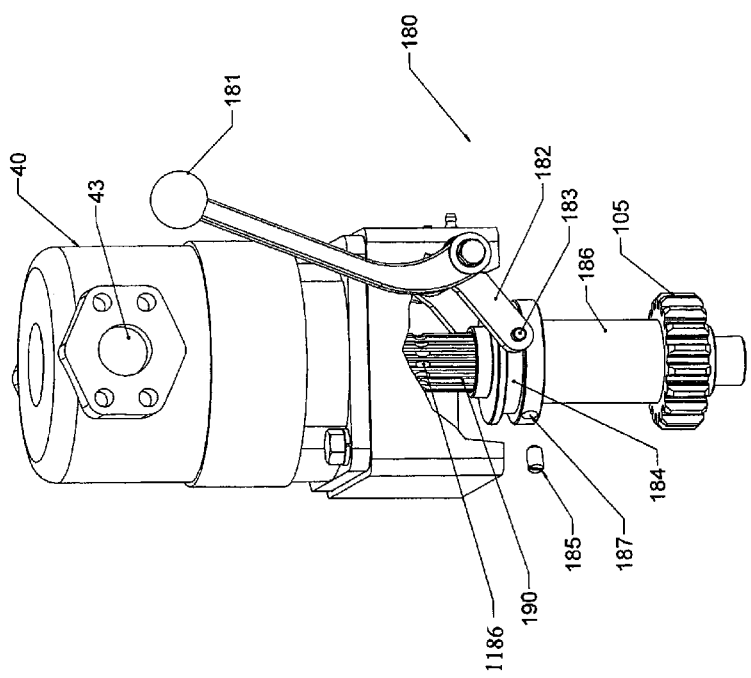
Figure 1B:
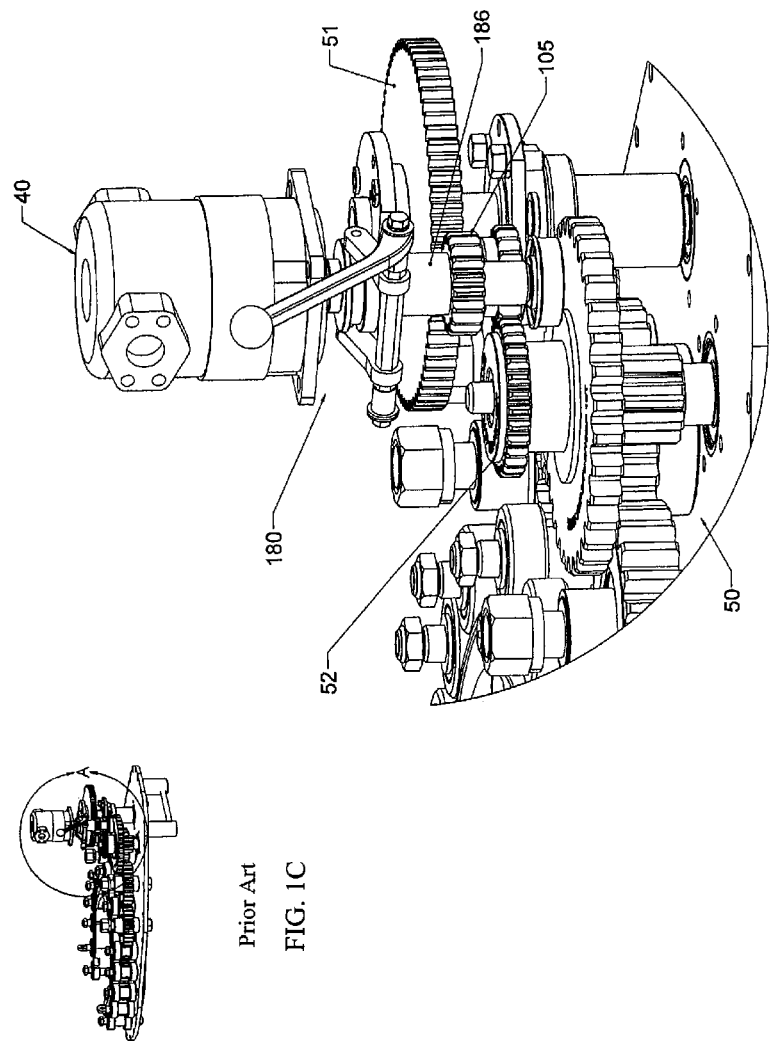
Figure 1C:
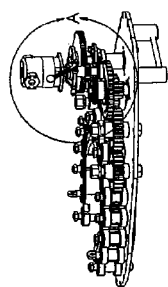

FIG. 1A illustrates a prior art power tong gear shift mechanism 180. The shift mechanism 180 is shown integrated to hydraulic motor 40 with splined drive shaft 190 extending from motor 40. A gear collar 186 having internal splines (hidden from view) will engage the splines on drive shaft 190, but allow gear collar 186 to slide up and down on drive shaft 190. Gear collar 186 includes a drive gear 105 fixed on its lower end which allows drive gear 105 to engage high and low speed gears in a power tong gear train. FIG. 1B, a detail inset of FIG. 1C, illustrates the gear shift mechanism 180 integrated with the gear train 50 of a conventional power tong. From FIG. 1B, it can be seen how gear collar 186 is able to slide up and down drive shaft 40 allowing drive gear 105 to selectively engage either high speed gear 52 and low speed gear 51. In FIG. 1A, gear shift mechanism 180 will move gear collar 186 up and down by way of shift handle 181 operating in conjunction with shift yoke 182. Shift yoke 182 will include a pair of yoke pins 183 which engage the collar groove 184. Although yoke pins 183 ride in collar groove 184, yoke pins 183 do not prevent gear collar 186 from rotating with respect to shift yoke 182. However, when yoke pins 183 move up or down with shift yoke 182, yoke pins 183 will act to move gear collar 186 up or down on drive shaft 190 in order to engage one or the other of high speed gear 52 or low speed gear 51. A detent aperture 187 will allow spring biased detent post 185 to engage detent groove 1186 on drive shaft 190 and selectively hold gear collar 186 at the proper height to engage the low speed gear 51 of gear train 50. Although hidden from view, a similar detent groove will exist to hold gear collar 186 at the correct height to engage high speed gear 52.

Figure 2A:
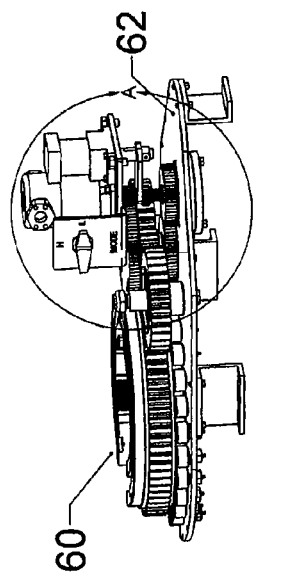
FIGS. 2A and 2B illustrates one embodiment of the gear shift mechanism of the present invention integrated with the gear train of a power tong.
Figure 2B:
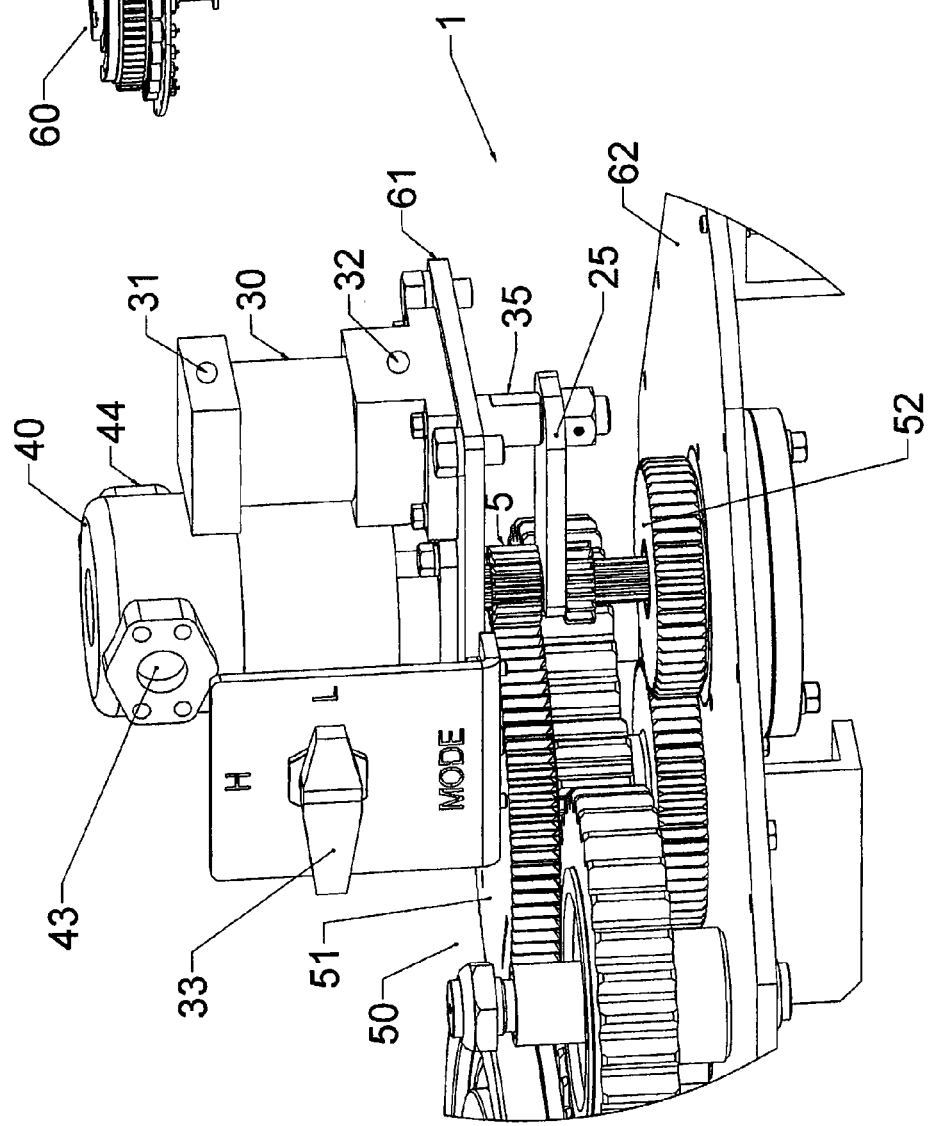

FIG. 2B, a detail inset of FIG. 2A, shows one embodiment of the gear shift mechanism 1 of the present invention being used with a power tong gear train 50. Power tong gear train 50 could be any number of conventional or future developed gear trains, but in the particular embodiment of FIG. 2B, gear train 50 includes low speed gear 51 and high speed gear 52. As is known in the art, gear train 50 will drive ring gear 60 causing the power tong to grip and apply torque to pipe, casing, and other tubular members. Gear train 50 is enclosed between bottom plate 62, top plate 61, and side plates, although the side plates and all but a portion of top plate 61 have been removed to illustrate gear train 50.

Figure 4:
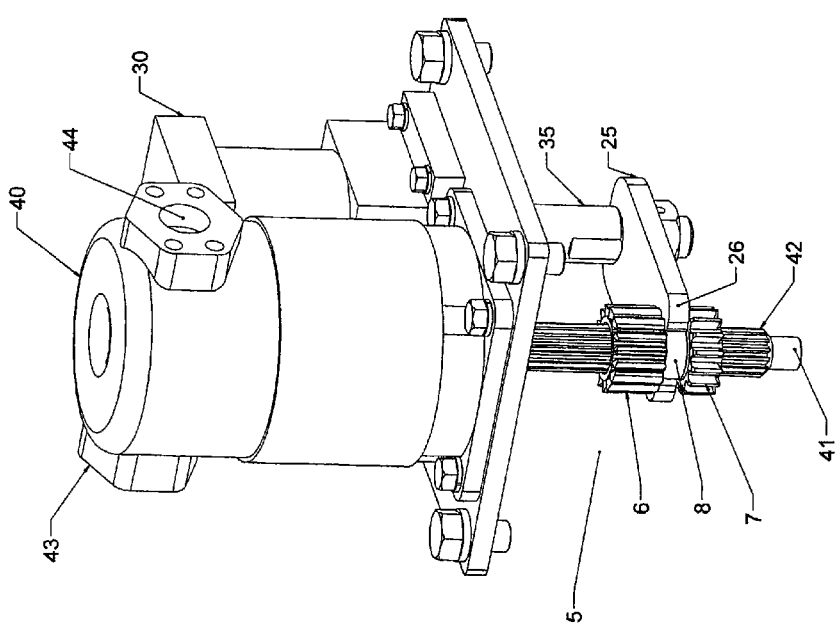
FIG. 4 is a different view of the gear shift system seen in FIG. 2B.

FIG. 2B's embodiment of gear shift mechanism 1 will generally include a linear actuator such as shift cylinder 30, shift arm 25, and drive gear 5. In FIG. 2B, shift cylinder 30 is a conventional double acting hydraulic piston and cylinder assembly position on top plate 61. However, many other types of linear actuators could be employed, alternative examples of which are described below in reference to FIGS. 5 to 8. Regarding shift cylinder 30, hydraulic fluid inlets/outlets 31/32 allow hydraulic fluid to enter and exit moving the piston within shift cylinder 30 upwards and downwards. The shifting valve 33 directs fluid to either the top or bottom of the piston within shift cylinder 30. A piston rod extension 35 extends out of shift cylinder 30 and through top plate 61. The shift arm 25 connects to rod extension 35 and engages drive gear 5. As better seen in FIG. 4, shift arm 25 has a fork end 26 which engages a fork groove 8 in drive gear 5. A tong motor 40 is also positioned on top plate 61 and has a motor shaft 41 extending through top plate 61. Typically, tong motor 40 will be hydraulically powered, but other motor types (e.g., electric) could be employed. In this embodiment, motor shaft 41 extends directly into the body of the power tong and engages the gear train 50 with drive gear 5. Motor shaft 41 does not engage any intermediate gears which in turn provide power to a shaft extending into the tong body. In the embodiment illustrated, motor shaft 41 includes a series of splines 42.

Figure 3A:
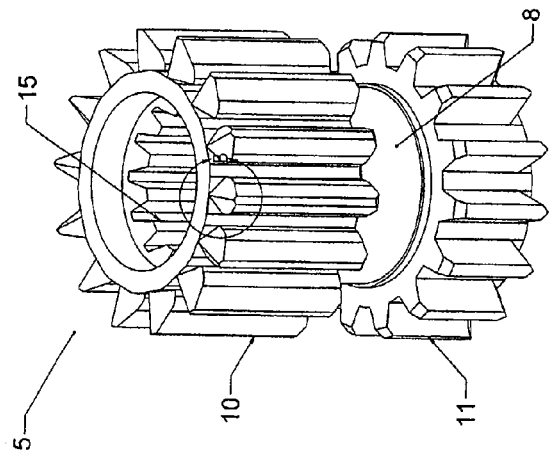
FIGS. 3A to 3F illustrate one embodiment of the drive gear of the present invention.

As best seen in FIG. 3A, drive gear 5 includes a series of internal spines 15 which allow drive gear 5 to engage spines 42 (see FIG. 4) on motor shaft 41 and to slide up and down on motor shaft 41, but not rotate relative to motor shaft 41. FIG. 3A illustrates how this embodiment of drive gear 5 has an upper set of gear teeth 10 and a lower set of gear teeth 11, with a fork groove 8 formed there between. Although the embodiment of FIGS. 1 to 3 show shift arm 25 having a fork 26 engaging fork groove 8 between upper gear 6 and lower gear 7, the invention could include other connections between shift arm 25 and motor shaft 41. For example, fork groove 8 could be above upper gear 6 or below lower gear 7, although motor shaft 41 may need to be considerably longer than seen in FIG. 2B and modifications made to drive gear 5 so it may engage gears 51 and 52 without interference from shift arm 25. Alternatively, rather than a fork groove, a bearing could be attached to motor shaft 41 and shaft arm 25 be attached to the bearing (allowing motor shaft 41 to rotate with respect to shift arm 25). The shift arm should be considered operatively connected to or operatively engaging the drive gear if the shift arm positions the drive gear using any of the above mechanical arrangements or any other mechanical arrangement allowing the shift arm to directly or indirectly change the position of the drive gear.

Figure 3F:
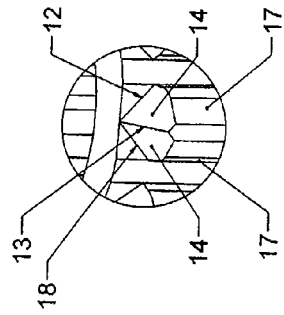
Figure 3B:
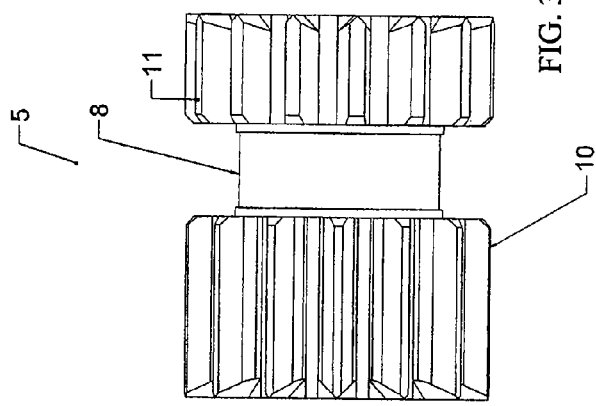

Viewing FIG. 3F, a detail inset of FIG. 3A, it can be seen that the top portion 12 of gear teeth 10 and 11 are beveled, forming a top ridge line 13 and sloping side shoulders 14. The base 18 of the teeth connect to the gear body and top ridge line 13 extends radially outward from base 18. The beveled top portion is formed by sloping side shoulders 14 extending from ridge line 13 to the sides 17 of the teeth. As used herein, the "top portion" of the gear teeth 10 and 11 means that portion which first engages another gear when meshing with that other gear. Thus, both sets of gear teeth 10 and 11 have top portions. In the illustrated embodiment, the top portion of the gear teeth are beveled at a 45 degree angle. However, other embodiments could be beveled at any angle between 30 and 60 degrees or even angles less than 30 degrees or more than 60 degrees (or any angle between 0 and 90 degrees). In the embodiments shown, the top portion of the gear teeth are considered fully beveled since the entire length of ridge line 13 has at least one sloping shoulders 14. However, there may be embodiments where something less than the entire length of ridge line 13 has at least one sloping side shoulders, for example, only 75% of ridge line 13 having a sloping side shoulder (or any percentage between 35% and 100% of ridge line 13 having a sloping side shoulder). Nor do the ridge line 13 and sloping shoulders 14 need to form perfectly sharp angles, but could also be somewhat rounded.

Figure 3D:
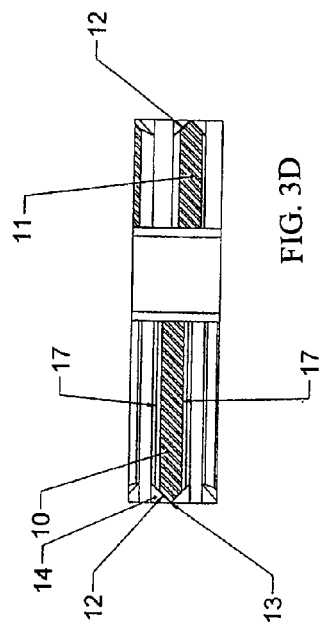
Figure 3E:
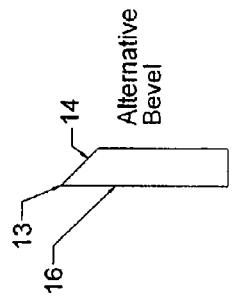
Figure 3C:
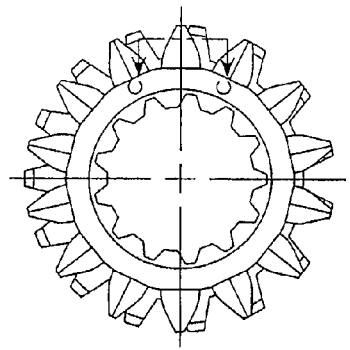

In FIG. 3D, upper gear teeth 10 are shown being somewhat offset from lower gear teeth 11 because the upper and lower sets of gears have a different ratio (or number of teeth). However, this is governed by the types of gears the which the upper and lower sets of gears will engage and will vary in different transmission designs. For example, in another embodiment, the two sets of gears may have the same ratio (i.e., not be offset). Whether the two sets of gear teeth are offset is not an important factor in the current invention.

Viewing FIG. 2B, it will be understood that when rod extension 35 moves shift arm 25 upwards, shift arm 25 raises drive gear 5 into engagement with low speed gear 51. As drive gear 5 and low speed gear 51 meet, the beveled top portion 12 of gear teeth 10 will come into contact the bottom of the teeth on low speed gear 51. Because beveled top portion 12 presents the sharp edge of top ridge 13 with sloping shoulders 14 on either side, the teeth of low speed gear 51 should slide down one of the sloping shoulders 14. This will cause drive gear 5 to rotate clockwise or counter-clockwise as it is forced against low speed gear 51. If motor 40 is not under power, shaft 41 (and thus drive gear 5) is free to rotate and drive gear 5 will be able to mesh with low speed gear 51 with a minimum of friction or grinding of teeth edges. Likewise, the same efficient meshing of gears will take place when drive gear 5 moves downward and lower gear teeth 11 engage high speed gear 52.

Typically the upper portion of the teeth on low speed gear 51 and high speed gear 52 will also be beveled to assist in smooth meshing with drive gear 5, although this may not be necessary in all cases. In a preferred embodiment, the bevel angle on gears 51 and 52 will be the compliment of the bevel angle on drive gear 5 (i.e., if the bevel angle on drive gear 5 is 60 degrees, the bevel angle on gears 51 and 52 will be 30 degrees). However, the invention also includes embodiments where the bevel angles on drive gear 5 and other meshing gears are not complimentary.

Other embodiments of the invention could have a one-sided bevel 16 (see FIG. 3E) which has its highest point or ridge line 13 at one side of the gear tooth's top and side shoulders 14 slopes downward across the entire width of the tooth (i.e., the tooth peak is to one side as opposed to the middle as in the embodiment of gear teeth 10 and 11 seen in FIG. 3A). In one embodiment, the drive gear 15 will have lower set of gear teeth 11 formed according to the data in Table 1a; upper set of gear teeth 10 formed according to the date in Table 1b; and internal spline 15 formed according to the data in Table 1c. However, Tables 1a, 1b, and 1c are merely examples and any number of variations may come within the scope of the present invention.

TABLE 1a

Lower External Gear Data

| | |
|---|---|
| Number Of Teeth | 15 |
| Diametral Pitch | 8/16 |
| Pressure Angle | 30° |
| Major Diameter | 2.000 |
| Minor Diameter | 1.691 |
| Pin Diameter | 0.240 |
| M.O.P. | 2.228 |

TABLE 1b

Upper External Gear Data

| | |
|---|---|
| Number Of Teeth | 14 |
| Diametral Pitch | 8 |
| Pressure Angle | 30° |
| Major Diameter | 2.000 |
| Minor Diameter | 1.438 |
| Pin Diameter | 0.216 |
| M.O.P. | 2.052 |

TABLE 1c

Internal External Gear Data

| | |
|---|---|
| Number Of Teeth | 13 |
| Diametral Pitch | 12/24 |
| Pressure Angle | 30° |
| Major Diameter | 1.200 |
| Minor Diameter | 1.005 |
| Pin Diameter | 0.144 |
| M.O.P. | 0.870 |

Figure 5:
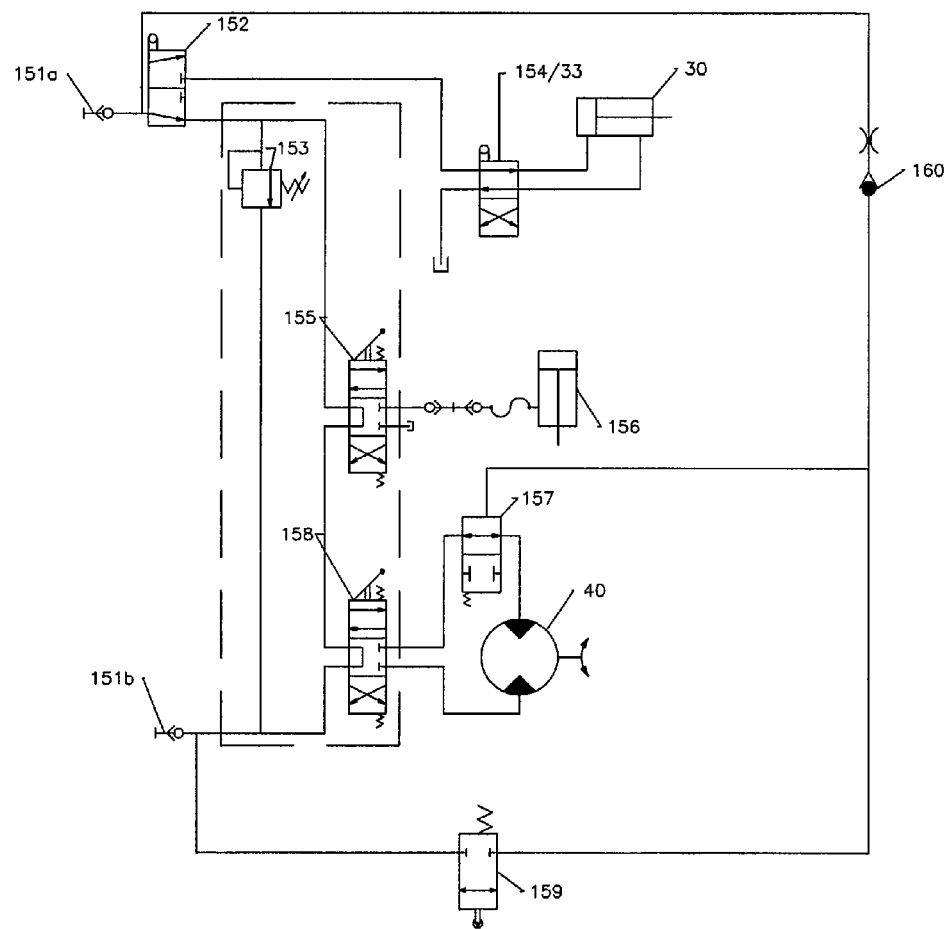
FIG. 5 is a hydraulic schematic of this embodiment of the gear shift system.

FIG. 5 is a schematic illustrating one embodiment of a hydraulic system incorporating the tong shift mechanism described above. The hydraulic fluid supply will connect at 151a to diverter valve 152. Valve 152 supplies fluid to switch valve 154/33 which operates shift cylinder 30 as described above. Line 150 will supply fluid through ball valve 160 to tong door opening and closing cylinder 159. Fluid entering cylinder control valve 155 will supply lift cylinder 156. Both tong door cylinder 159 and lift cylinder 156 pertain to tong operations unrelated to gear shifting and therefore, not shown in the other figures. Fluid entering motor control valve 158 will supply motor 40 via pilot operated shut-off valve 157. FIG. 5 also illustrates relief valve 153 and fluid return outlet at 151b. Naturally, FIG. 5 illustrates but one hydraulic circuit and many other circuits, hydraulic or otherwise, could be employed.

Figure 6:
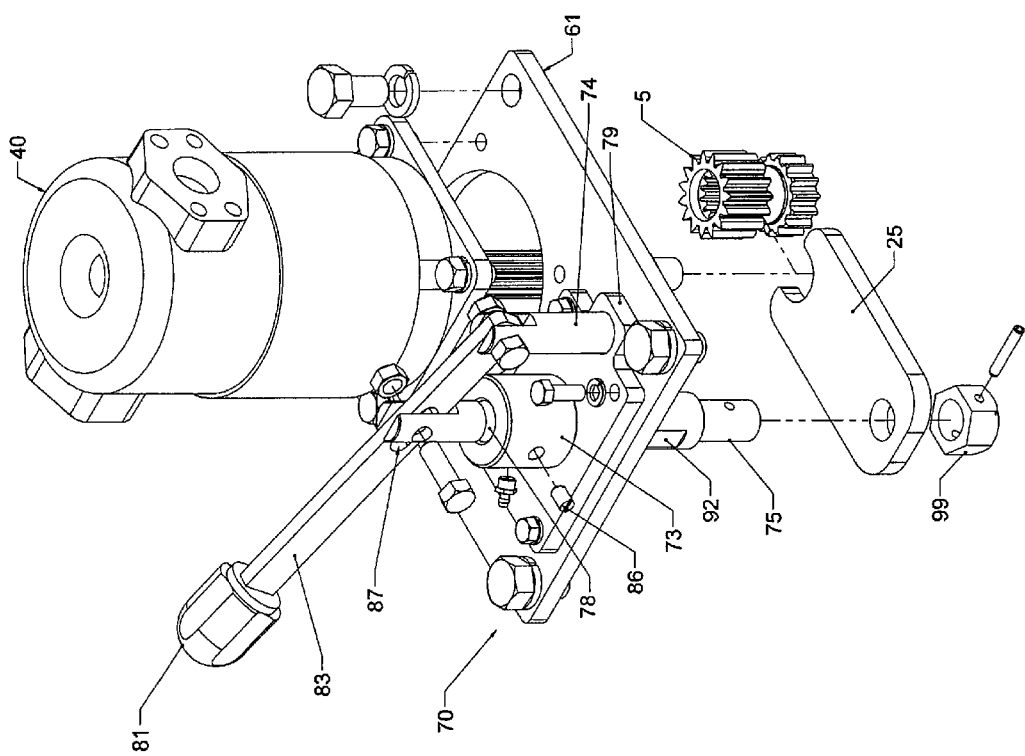
FIG. 6 illustrates a manual shift embodiment of the gear shift system.

While FIGS. 1 to 3 show an embodiment having a hydraulic shift cylinder effecting the movement of drive gear 5, alternative embodiments such as seen in FIG. 6 could employ a manual shifting system. FIG. 6 suggests how hydraulic motor 40 will be positioned on top plate 61 as in earlier embodiments. However, shift cylinder 30 is replaced by manual shift mechanism 70. Manual shift mechanism 70 will generally comprise a shift arm 83, a shift rod 75, a rod guide collar 73 and an anchor post 74. It can be seen that shift arm 25 is fixed onto shift rod 75 by nut 99 and will engage drive gear 5 in a manner similar to that described with reference to FIG. 4 above. Both anchor post 74 and rod guide collar 73 are fixed onto base plate 79 which rests on top plate 61. Both anchor post 74 and rod guide collar 73 may be fixed to base plate 79 by any conventional means, including welding or counter-sunk screws engaging these structures from the bottom of base plate 79. Shift rod 75 extends through rod guide collar 73 and through apertures (as suggested but hidden from view in FIG. 6) in base plate 79 and top plate 61. This embodiment of shift rod 75 includes a flat section 92 which corresponds to a flat side of the apertures in base plate 79 and top plate 61 in order to allow vertical movement of shift rod 75 but prevent its rotation within rod guide collar 73.

The shift arm 83 will have a handle 81 on one end and a bolt aperture 88 on the opposite end with an elongated slot 87 in between. The end of shift arm 83 having aperture 88 will be pinned or bolted to a fork in anchor post 74 such that shift arm 83 may rotate with respect to anchor post 74. A second pin or bolt will engage a fork on top of shift rod 75 and pass though elongated slot 87 on shift arm 83. Form this mechanical arrangement, it can clearly be seen how moving shift handle 81 up or down will cause shift rod 75 to move up and down (thus moving drive gear 5 to its various positions engaging a gear train 50 such as seen in FIG. 2B). FIG. 6 also shows a detent groove 78 formed on shift rod 75 and a detent post 86 which extends through an aperture in rod guide collar 73. Although not explicitly shown, it will be understood that a spring or other device will bias detent post 86 inward to contact shift rod 75. In the embodiment shown in FIG. 6 and as is commonly employed in detent post/groove mechanisms, detent groove 78 has a 60° entry/exit chamfer, which allows detent post 86 to engage detent groove 78 and hold shift rod 75 in place against a moderate amount of force, but also allows a larger force to push detent post 86 out of engagement with groove 78. However, in another embodiment, detent groove 78 may have a square shoulder and detent post 86 includes a finger grip to allow an operator to grasp detent post 86 and manually withdraw detent post 86 from engagement with detent groove 78. In the embodiment of shift rod 75 seen in FIG. 6, there will be two detent grooves 78 allowing shift rod 75 to move and temporarily lock between upper and lower position (thereby allowing drive gear 5 to engage the high speed or low speed gears). Naturally, other embodiments could encompass a different number of detent grooves.

Figure 7:
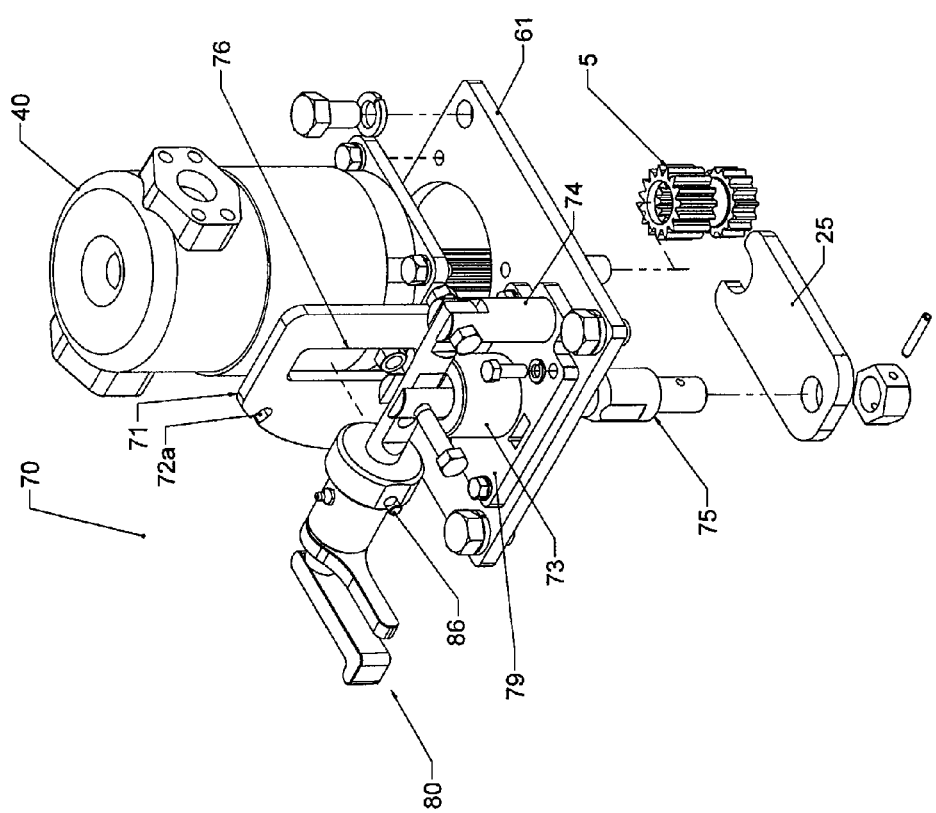
FIG. 7 illustrates an alternative manual shift embodiment of the gear shift system.
Figure 8:
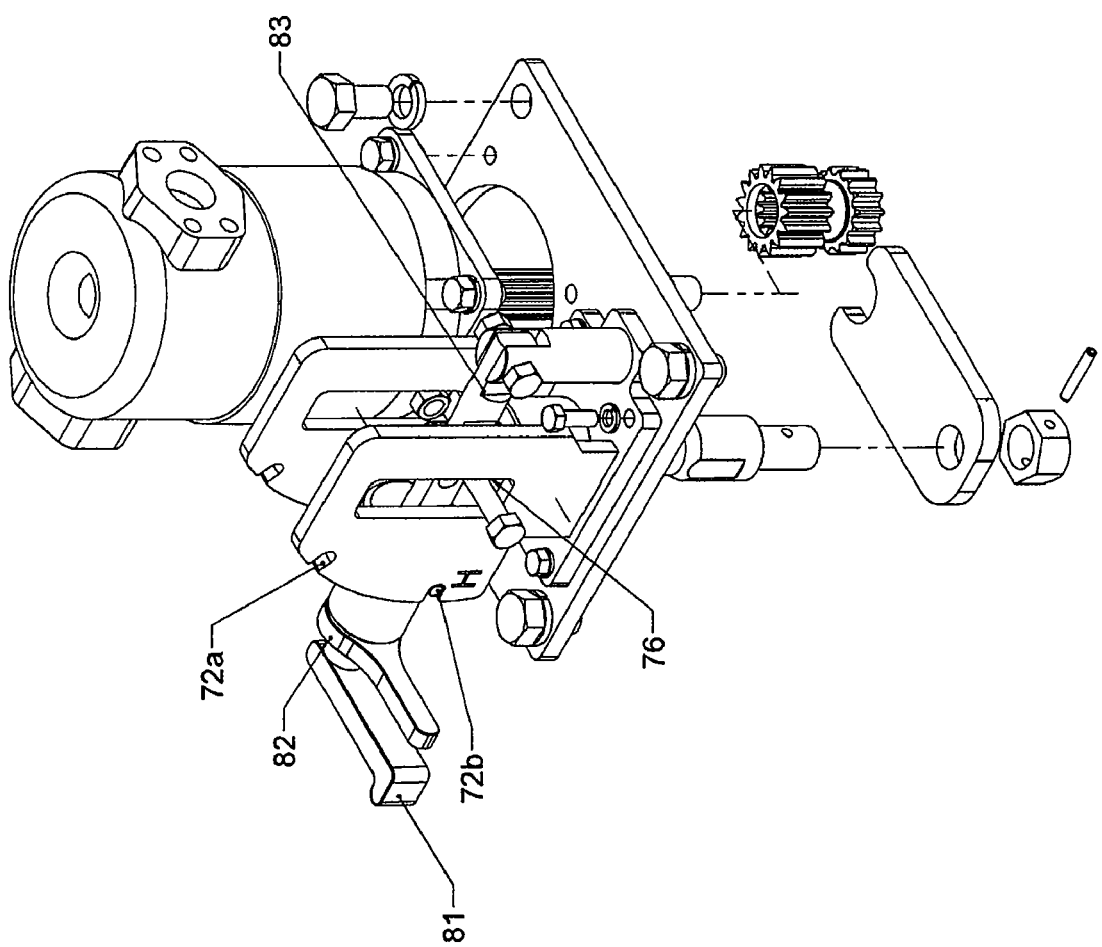
FIG. 8 is a slightly modified view of the manual shift embodiment of FIG. 7.
Figure 9:
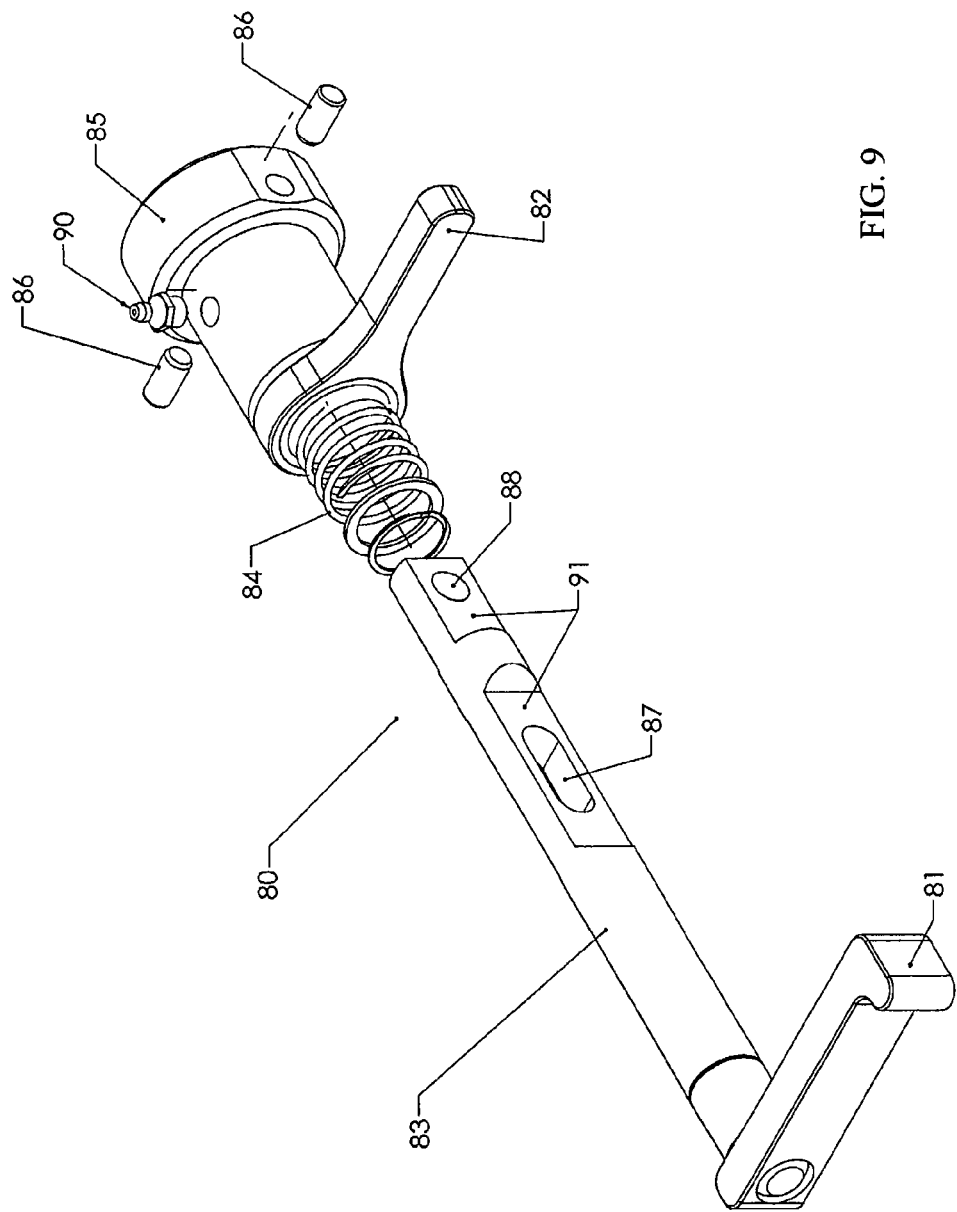
FIG. 9 is exploded view of a shift handle assembly of the embodiment of FIG. 7.

FIGS. 6 to 8 illustrate a different embodiment of manual shift mechanism 70. In this embodiment, a more complex shift handle assembly 80 engages anchor post 74 and shift rod 75. The exploded view of FIG. 9 better illustrates the details of shift handle assembly 80. Shift handle assembly 80 includes shift arm 83 having a fixed handle 81 on one end, bolt aperture 88 on the other end, and elongated slot 87 in between. In this embodiment, both aperture 88 and elongated slot 87 are formed on flat surfaces 91 which engage the forks in anchor post 74 and shift rod 75. A detent collar 85 will include detent apertures 89 with detent posts 86 positioned therein. In this embodiment, detent posts 86 need not be biased with springs, but only need be fixed in and protrude from detent apertures 89. Detent collar 85 will also include a sliding handle 82 and a grease fitting 90. A spring 84 will be positioned between detent collar 85 and fixed handle 81 and bias detent collar 85 (and sliding handle 82) away from fixed handle 81. Viewing FIG. 7, it can be seen how not only shift handle assembly 80 is positioned on base plate 79, but also that guide plates 71 are positioned on base plate 79 (see FIG. 8 for second guide plate 71). Guide plates 71 will include slots 76 to accommodate the bolt engaging elongated slot 87 and will have two detent grooves 72a and 72b (best seen in FIG. 8). It will be readily apparent that in operation, detent posts 86 will engage detent grooves 72a or 72b in order to lock shift arm 83 in an upper or lower position (and correspondingly shift rod 75 and drive gear 5). When it is desired to move shift arm 83 from one position to another, sliding handle 82 will be pulled back toward fixed handle 81 causing detent collar 85 to move toward fixed handle 81 and consequently causing detent posts 86 to become disengaged from the detent grooves 72a or 72b. Shift arm 83 is then free move up or down in order to move to the other detent groove and shift drive gear 5 to the other (high or low speed) gear train.

Although the above specification describes the invention in terms of specific embodiments, those skilled in the art will recognize many modifications and variations. For example, while drive gear 5 is shown as having two sets of gear teeth, other embodiments could possibly contain more than two sets. Likewise, shift cylinder 30 and the manual shift mechanisms 70 shown in the figures only represent three example gear shifters and many other variations are possible. Different elements described herein as "connected" may be directly connected or connected by intermediate structural elements. All such variation and modifications are intended to come within the scope of the following claims.

We claim:

1. A power tong comprising a ring gear, a gear train, a motor and a gear shift mechanism, said gear shift mechanism comprising:
   a. a linear actuator;
   b. a shift arm connected to said linear actuator;
   c. a drive gear positioned on a drive shaft extending from said motor, said drive gear comprising an upper and lower set of drive teeth and being operatively engaged by said shift arm;
   d. wherein said upper and lower set of drive teeth have substantially fully beveled top portions comprising at least one sloping side shoulder; and
   e. said movement of said linear actuator causes said drive gear to engage one of at least two gears in said gear train.

2. The power tong according to claim 1, wherein said linear actuator comprises a piston and cylinder assembly.

3. The power tong according to claim 2, wherein said piston and cylinder assembly is hydraulically activated.

4. The power tong according to claim 1, wherein said linear actuator moves in a direction substantially parallel to a direction at which said motor drive shaft extends.

5. The power tong according to claim 1, wherein said beveled top portions of said drive teeth are beveled at an angle of between 30 and 60 degrees.

6. The power tong according to claim 1, wherein said power tong has a top plate and a bottom plate and said gear train and said drive gear are positioned between said top and bottom plate.

7. The power tong according to claim 1, wherein said drive teeth are beveled on two sides.

8. The power tong according to claim 1, wherein said drive teeth are beveled on one side.

9. The power tong according to claim 1, wherein said upper and lower drive teeth are offset from one another.

10. The power tong according to claim 1, wherein said beveled top portions comprise a ridge line extending radially from a base of said drive teeth and at least one sloping side shoulder extending from said ridge line to a side of said drive teeth.

11. The power tong according to claim 10, wherein said ridge line is in an approximate middle of said top portions and a sloping side shoulder is formed on each side of said ridge line.

12. The power tong according to claim 1, wherein said linear actuator is part of a manual shift assembly.

13. The power tong according to claim 12, wherein said manual shift assembly includes a releasable locking mechanism for locking said shift assembly in at least one of two positions.

14. The power tong according to claim 13, wherein said releasable locking mechanism comprises a shift rod having a detent groove formed thereon and a detent post capable of releasably engaging said detent groove.

15. A power tong comprising:
   a. a tong body comprising a top plate and a bottom plate forming a cavity there between;
   b. a ring gear and gear train positioned within said cavity, said gear train including a high speed and a low speed gear;
   c. a motor having a drive shaft extending directly into said cavity, said drive shaft including a drive gear connected thereon and said drive gear selectively engaging said high speed gear or said low speed gear, and wherein said motor is coupled to said top plate;
   d. a linear actuator coupled to said top plate on a same side of said top plate as said motor, and said linear actuator comprising a rod extension projecting into said cavity substantially parallel to said motor drive shaft; and
   e. a shift arm operatively connected to said rod extension and capable of moving said drive gear into selective engagement with at least one of said high or low speed gears.

16. The power tong according to claim 15, wherein said linear actuator moves said shift arm.

17. The power tong according to claim 15, wherein said drive gear further comprises teeth having substantially fully beveled top portions.

18. The power tong according to claim 15, wherein said motor drive shaft is splined and said drive gear has internal mating splines for slidingly engaging said motor drive shaft.

19. A drive train comprising:
   a. a gear train comprising at least a low speed and a high speed gear positioned in a gear housing, at least one of said low speed or said high speed gear rotating on a gear shaft;
   b. a motor positioned proximate said gear train, said motor having a drive shaft extending into said gear housing substantially parallel to said gear shaft;
   c. a drive gear slidingly positioned on said drive shaft, said drive gear comprising at least one set of drive teeth, said drive teeth comprising ridge lines extending radially from a base of said drive teeth and at least one sloping side shoulder extending from said ridge lines to a side of said drive teeth; and
   d. a gear shifter engaging said drive gear and selectively moving said drive gear along said drive shaft.

20. A power tong comprising a ring gear, a gear train, a motor and a gear shift mechanism, said gear shift mechanism comprising:
   a. a linear actuator;
   b. a shift arm connected to said linear actuator;
   c. a drive gear positioned on a drive shaft extending from said motor, said drive gear comprising an upper and lower set of drive teeth and being operatively engaged by said shift arm;
   d. wherein said upper and lower set of drive teeth have substantially fully beveled top portions; and
   e. said movement of said linear actuator causes said drive gear to engage one of at least two gears in said gear train;
   f. wherein said shift arm engages said drive gear between said upper and lower set of drive teeth.

21. A power tong comprising:
   a. a tong body comprising a top plate and a bottom plate forming a cavity there between;

b. a ring gear and gear train positioned within said cavity, said gear train including a high speed and a low speed gear;
c. a motor having a drive shaft extending directly into said cavity, said drive shaft including a drive gear connected thereon and said drive gear selectively engaging said high speed gear or said low speed gear, and wherein said top plate is more proximate to the motor than said bottom plate;
d. a linear actuator connected on a same side of said top plate as said motor, and said linear actuator having a rod extension projecting into said cavity substantially parallel to said motor drive shaft; and
e. a shift arm operatively connected to said rod extension and capable of moving said drive gear into selective engagement with at least one of said high or low speed gears;
f. wherein said drive gear engages said low speed gear externally and engages said high speed gear internally.

* * * * *